United States Patent
Miyazoe et al.

(10) Patent No.: US 6,807,981 B2
(45) Date of Patent: Oct. 26, 2004

(54) MANIFOLD FOR ELECTROMAGNETIC VALVE

(75) Inventors: Shinji Miyazoe, Ibaraki (JP); Masaru Narita, Ibaraki (JP); Makoto Ishikawa, Ibaraki (JP)

(73) Assignee: SMC Corporation, Tokyo (JP)

( * ) Notice: Subject to any disclaimer, the term of this patent is extended or adjusted under 35 U.S.C. 154(b) by 167 days.

(21) Appl. No.: 10/197,456

(22) Filed: Jul. 18, 2002

(65) Prior Publication Data

US 2003/0029510 A1 Feb. 13, 2003

(30) Foreign Application Priority Data

Aug. 13, 2001 (JP) ........................................ 2001-245724

(51) Int. Cl.[7] .............................................. F16K 11/10
(52) U.S. Cl. .................................... 137/269; 137/884
(58) Field of Search ............................. 137/269, 271, 137/884, 270

(56) References Cited

U.S. PATENT DOCUMENTS

| | | | | |
|---|---|---|---|---|
| 3,213,883 A | * | 10/1965 | Carls | 137/884 |
| 3,457,943 A | * | 7/1969 | Kawabata | 137/269 |
| 3,487,848 A | * | 1/1970 | Leibfritz et al. | 137/271 |
| 3,513,876 A | * | 5/1970 | Tarbox | 137/884 |
| 3,766,943 A | * | 10/1973 | Murata | 137/884 |
| 4,449,426 A | * | 5/1984 | Younger | 477/127 |
| 4,898,203 A | * | 2/1990 | Kobelt | 137/269 |
| 6,408,868 B2 | * | 6/2002 | Rondreux et al. | 137/270 |
| 6,446,668 B2 | * | 9/2002 | Hedlund | 137/271 |

FOREIGN PATENT DOCUMENTS

| | | |
|---|---|---|
| AT | 250116 | 10/1966 |
| DE | 2 206 767 | 8/1973 |
| DE | 69 13 858 | 3/1984 |
| GB | 1 390 297 | 4/1975 |

* cited by examiner

*Primary Examiner*—John Fox
(74) *Attorney, Agent, or Firm*—Oblon, Spivak, McClelland, Maier & Neustadt, P.C.

(57) ABSTRACT

A manifold 10A is divided into a manifold main body 12 and a sub-plate 13, a plurality of branch holes 14a, 15a and 16a extending from a mounting face vertically and straightly to communicate with fluid flow passages 14, 15 and 16 are provided in the manifold main body 12, a plurality of relay holes 24, 25 and 26 which causes the respective branch holes 14a, 15a and 16a to communicate with respective ports 21, 22 and 23 of an electromagnetic valve 11 are provided in the sub-plate 13, and the relay hole and the branch hole whose positions are different to each other are caused to communicate with each other via a recessed portion 29 formed on an lower face of the sub-plate 13.

7 Claims, 6 Drawing Sheets

MANIFOLD FOR ELECTROMAGNETIC VALVE

TECHNICAL FIELD TO WHICH THE INVENTION BELONGS

The present invention relates to a manifold mounted with an electromagnetic valve.

PRIOR ART

Figure 7:
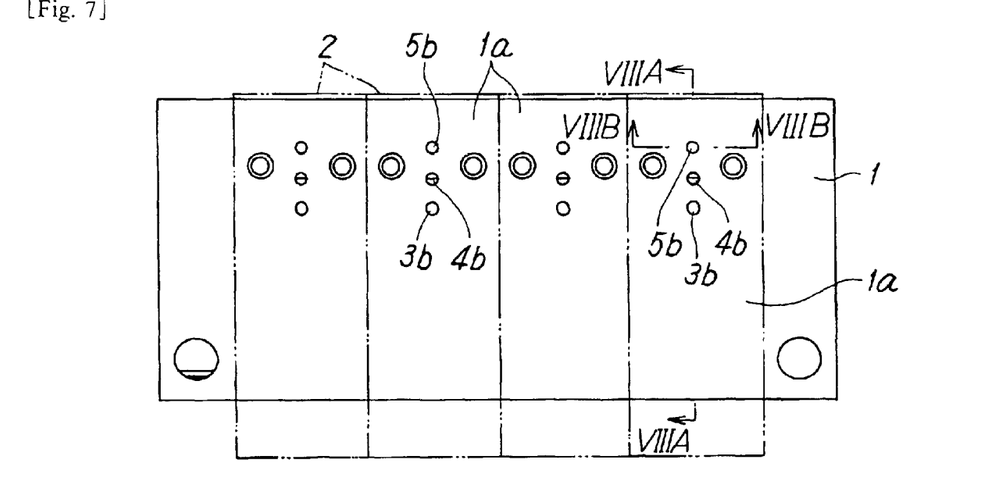
FIG. 7 is a plan view of a conventional manifold.

A known manifold is shown in FIG. 7. The manifold is provided on its upper surface with a mounting face 1 on which a plurality of electromagnetic valves 2 are mountable and it is provided therein with a common supplying flow passage 3 for supplying pressure fluid to these electromagnetic valves 2 concentrically, a common discharging flow passage 4 for discharging exhaust gas from the electromagnetic valves 2 collectively, and individual output flow passages 5 for taking out output fluids from the respective electromagnetic valves 2, as understood from FIGS. 8(A) and 8(B), and the respective flow passages 3, 4 and 5 are caused to communicate with a plurality of connection ports 3b, 4b and 5b opened to a individual electromagnetic valve mounting area 1a on the mounting face 1 via branch holes 3a, 4a and 5a. Then, when the electromagnetic valves 2 are mounted on the mounting face 1, the connection openings 3b, 4b, 5ba are respectively in communication with fluid connection ports formed in the respective electromagnetic valves 2.

Figure 8:
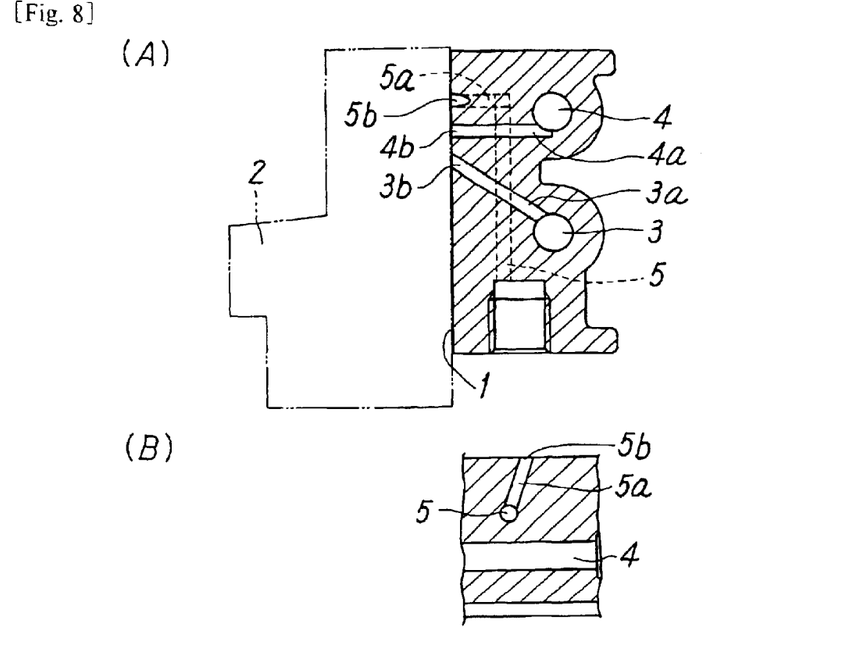

In a manifold of this type, since a plurality of fluid flow passages 3, 4 and 5 must be formed within a restricted volume so as not to interfere with one another positionally, there occurs often a case that the supplying flow passage 3 and the discharging flow passage 4 are formed at positions separated from each other, for example, as shown in FIGS. 8(A) and 8(B), and the connection ports 3b, 4b opened to the mounting face 1 are formed so as to be close to each other in relationship with each port of the electromagnetic valve 2. Also, since the output flow passage 5 also bypasses the other flow passages, branch holes or the like, it is formed at a position separated from the connection port 5b on the corresponding mounting face 1 in a side direction in many cases. Then, in such a case, the discharging flow passage 4 and the connection opening 4b for discharge formed at positions opposed to each other in a vertical direction can be connected to each other through the branch hole 4a bored from the mounting face 1 vertically and straightly, but the supplying flow passage 3 and the connection opening 3b for supply, and the output flow passage 5 and the connection opening 5b for output which are respectively put in a positional relationship where they are shifted from one another in a transverse direction must be respectively connected by the branch holes 3a and 5a bored inclined from the mounting face 1 obliquely and downwardly.

However, in order to bore the branch holes so as to be inclined obliquely from the mounting face in this manner, the manifold must be held in a state where it is inclined at a required angle at a time of machining thereof so that the working is troublesome and a complicated working machine is required, particularly, the working further becomes troublesome and much time and labor are required in case that a plurality of branch holes having different inclination angles are provided, or both vertical branch holes and inclined branch holes are provided.

DISCLOSURE OF THE INVENTION

A technical object of the present invention is to provide a manifold for an electromagnetic valve which is provided with a simple and reasonable design structure and where, even when a fluid flow passage inside the manifold and an opening on an electromagnetic valve mounting face are put in a positional relationship where they have been shifted from each other in a transverse direction, they can be caused to securely communicate with each other by a branch hole bored from the mounting face vertically and straightly.

In order to solve the above object, according to the present invention, there is provided a manifold comprising: one manifold main body provided inside with a plurality of fluid flow passages and at least one sub-plate which is mounted on the manifold main body and which is formed with a mounting face for an electromagnetic valve.

The manifold main body has a mounting face on which the sub-plate is to be mounted and a plurality of branch holes which extends from the mounting face vertically and straightly to communicate with the respective fluid flow passages, and the sub-plate has a plurality relay holes causing the respective branch holes to communicate with respective ports of the electromagnetic valve, the relay holes are at least one of the relay holes is formed at a position different from that of a corresponding branch hole, and the relay hole and the branch hole whose positions are different from each other communicate with each other via a recessed portion formed on a lower face of the sub-plate so as to stretch over the relay hole and the branch hole.

In this manner, according to the present invention, a manifold is divided into a manifold main portion and a sub-plate portion, vertical branch holes communicating with respective fluid flow passages in the manifold main body are formed in the manifold main body, a plurality of relay holes communicating with respective ports of an electromagnetic valve are formed in the sub-plate formed with a mounting face for the electromagnetic valve, and corresponding relay hole and branch hole are caused to communicating with each other in a recessed portion provided in the sub-plate, so that, even when the corresponding fluid flow passage and relay hole are put in a positional relationship where they have been shifted from each other in a transverse direction, they can be securely connected to each other by the branch hole bored in the manifold main body vertically.

According to a preferred embodiment of the present invention, the manifold main body and the sub-plate are respectively formed of metal material, and they are joined integrally by soldering joining faces thereof. In this case, in order to prevent a positional deviation between the manifold main body and the sub-plate at a time of soldering joint, it is preferable to provide positioning means comprising a projection and a recess that mutually engage each other.

According to a specific embodiment of the present invention, the manifold main body is formed so as to be mountable with a plurality of electromagnetic valves, and the sub-plate is divided for each of individual electromagnetic valves.

According to another specific embodiment of the present invention, such a constitution can be employed that the manifold main body and the sub-plate are divided for each of individual electromagnetic valves, and they are constituted so a to be used by joining a plurality of the manifold main bodies and a plurality of the sub-plates.

BRIEF DESCRIPTION OF THE DRAWINGS

FIG. 8 (A) is a sectional view taken along line VIIIA—VIIIA in FIG. 7, and FIG. 8(B) is a sectional view taken along line VIIIB—VIIIB in FIG. 7.

DETAILED DESCRIPTION

Figure 5:
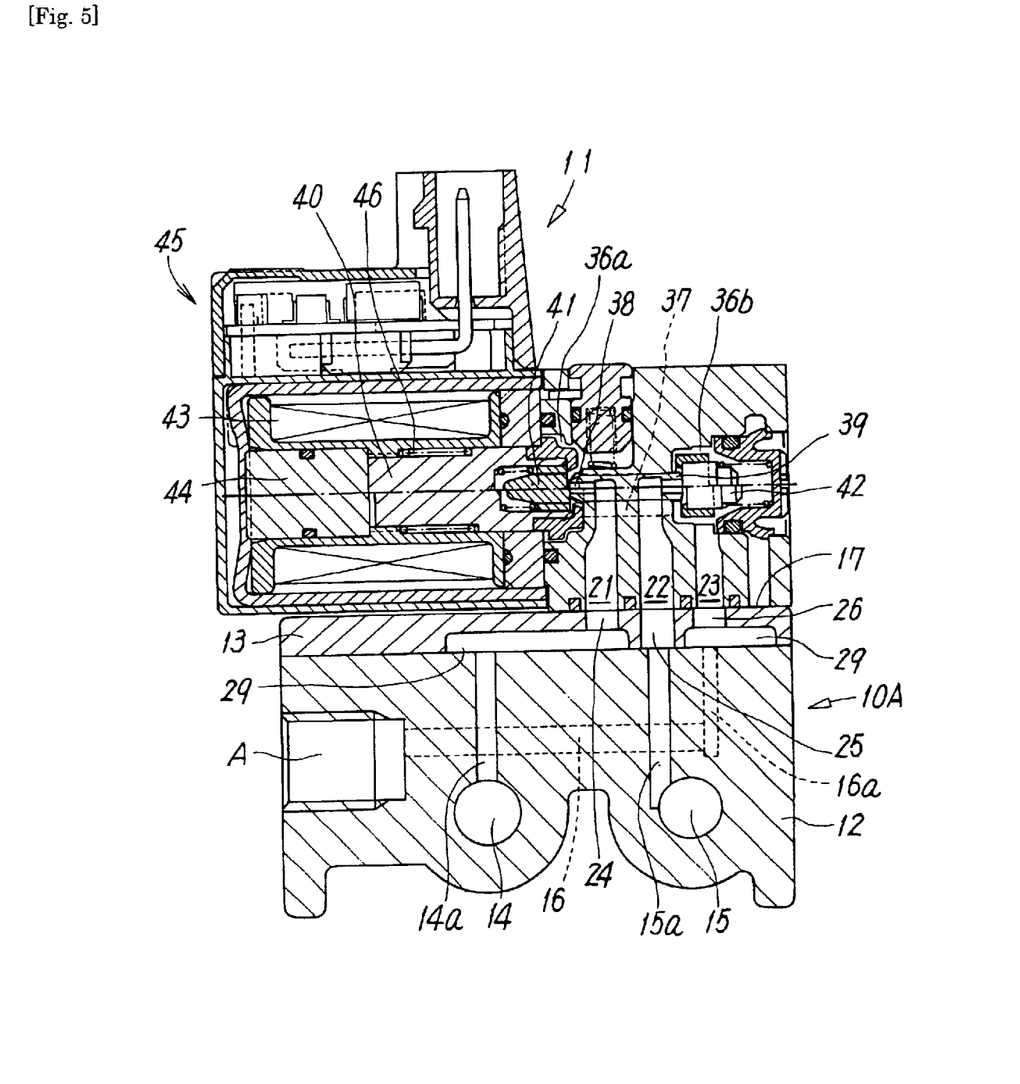
FIG. 5 is a sectional view of a state where an electromagnetic valve is mounted on a manifold.

FIG. 1 and FIGS. 2(A), 2(B) and 2(C) show a first embodiment of a manifold for an electromagnetic valve according to the present invention, and a manifold 10A of the first embodiment is a single type manifold constituted so as to be mountable with a plurality of electromagnetic valves 11 (refer to FIG. 5). The manifold 10A is constituted with one manifold main body 12 provided therein with a plurality of fluid flow passages 14, 15 and 16 and a plurality of sub-plates 13 which are mounted on the manifold main body 12 to form electromagnetic valve mounting faces 17.

Figure 1:
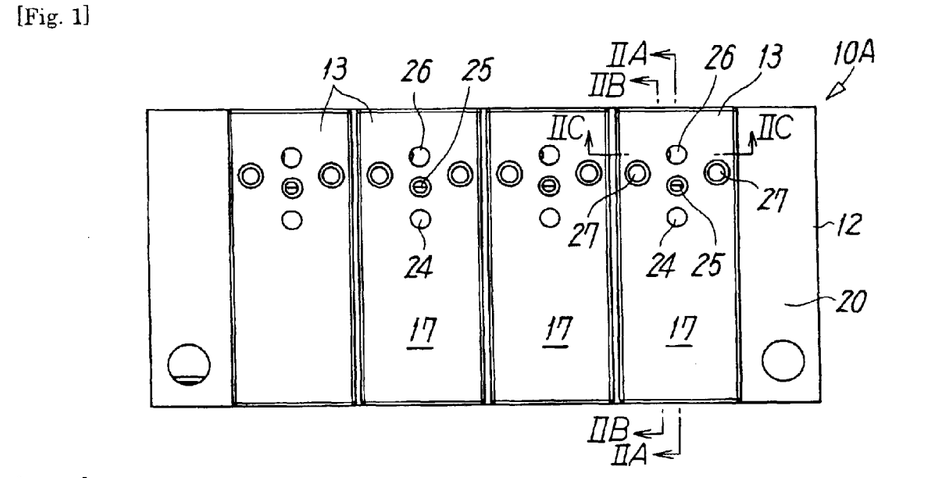
FIG. 1 is plan view showing a first embodiment of a manifold for an electromagnetic valve according to the present invention.
Figure 2:
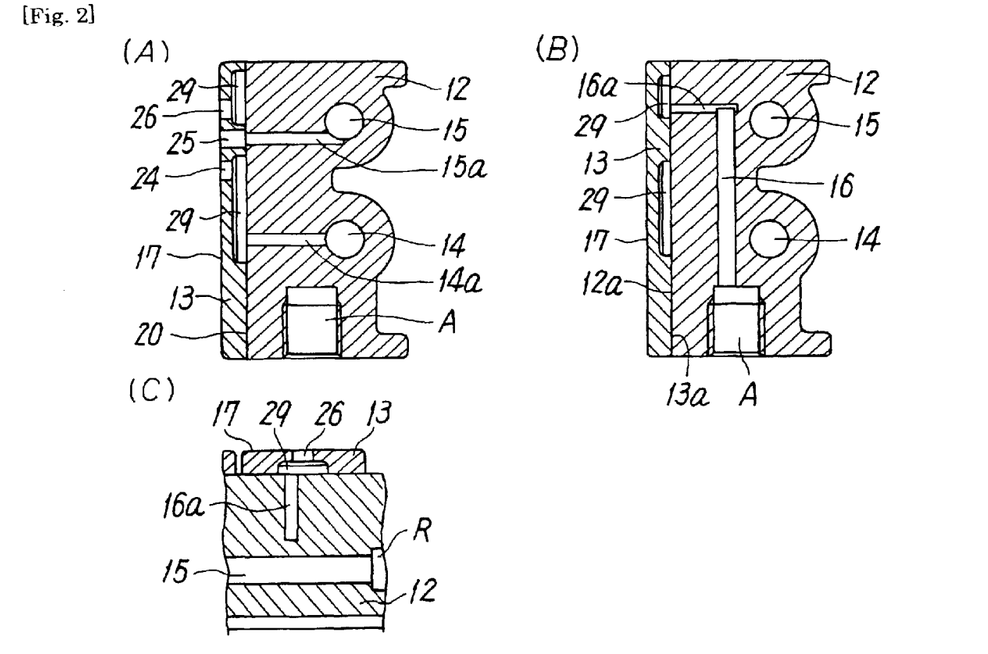
FIG. 2(A) is a sectional view taken along line IIA—IIA in FIG. 1.
FIG. 2(B) is a sectional view taken along line IIB—IIB in FIG. 1
FIG. 2(C) is a sectional view taken along line IIC—IIC in FIG. 1.
Figure 3:
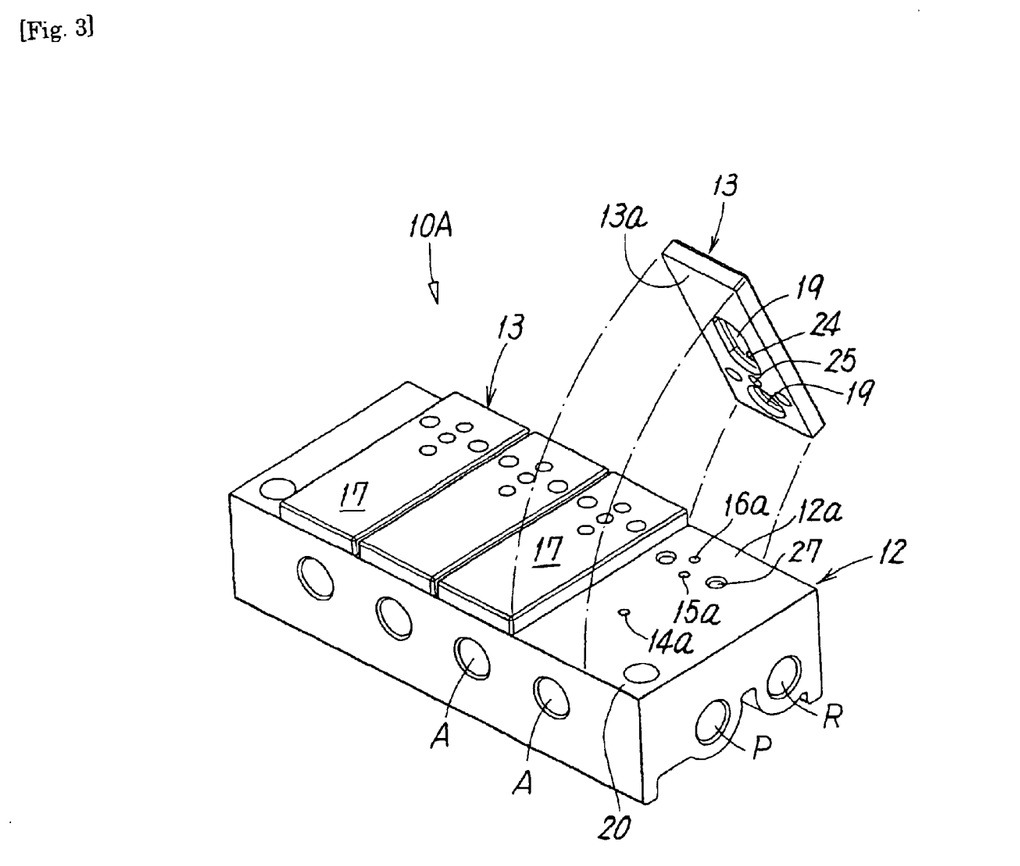
FIG. 3 is a perspective view showing a state where one of sub-plates is separated from a manifold.

The manifold main body 12 is a block-shaped member thinly extending in an axial direction and it has a rectangular and flat upper face, and the upper face is a mounting face 20 for mounting the sub-plate 13. A common supplying fluid flow passage 14 for collectively supplying pressure fluid such as compressed air or the like to respective electromagnetic valves 11 mounted on the manifold main body 12, and a common discharging fluid flow passage 15 for collectively discharging pressure fluid discharged from the respective electromagnetic valves 11 are provided in the manifold main body 12 so as to penetrate the manifold main body 12 in an axial direction thereof, and supplying ports P and discharging ports R which respectively communicate with the fluid flow passages 14 and 15 are provided on one end face or both end faces of the manifold main body 12 in the axial direction thereof, as understood from FIG. 3. Also, output ports A for taking out output fluids output from the respective electromagnetic valves 11 individually are respectively provided at positions corresponding to the respective sub-plates 13 on the side face of the manifold main body 12, and the outputting fluid flow passages 16 extend horizontally from the respective output ports A in a transverse direction of the manifold main body 12.

Also, a plurality of branch holes 14a, 15a and 16a extending vertically and straightly from the respective fluid flow passages 14, 15 and 16 towards the mounting face 20 are provided in the manifold main body 12, and the branch holes 14a, 15a and 16a are respectively opened to mounting areas of the respective sub-plates 13 on the mounting face 20.

On the other hand, the sub-plate 13 is a rectangular and flat plate with an even thickness and it has the same length as the width of the mounting face 20, and the sub-plates 13 are arranged on the mounting face 20 in a state that they has slight gaps among them and they are mounted on the manifold main body 12 by soldering. Each sub-plate 13 has its top face serving as a mounting face 17 for an electromagnetic valve 11, and a plurality of relay holes 24, 25 and 26 corresponding to a plurality of ports 21, 21 and 23 (refer to FIG. 5) formed on a bottom face of the electromagnetic valve 11 are respectively opened to the mounting face 17. When the electromagnetic valve 11 is mounted on the mounting face 17, as shown in FIG. 5, the relay holes 24, 25 and 26, and the respective ports 21, 22 and 23 of the electromagnetic valve 11 mutually communicate with each other. In the drawings, reference numeral 27 denotes a screw hole for fixing the mounted electromagnetic valve 11.

The plurality of relay holes 24, 25 and 26 formed in the sub-plate 13 are for causing the plurality of branch holes 14a, 15a and 16a opened to the mounting face 20 of the manifold main body 12, and the plurality of ports 21, 22 and 23 of the electromagnetic valve 11 to mutually communicate with each other. However, corresponding ones of the relay holes 24, 25 and 26 and the branch holes 14a, 15a and 16a are not always formed at coaxial positions, but some or all thereof are formed so as to occupy positions different in a transverse direction. That is, in the illustrated embodiment, the branch hole 15a for discharging communicating with the fluid flow passage 15 for discharging and the relay hole 25 for discharging corresponding thereto are formed at a coaxial position, but the branch hole 14a for supplying communicating with the fluid flow passage 14 for supplying and the relay hole 24 for supplying corresponding thereto, and the branch hole 16a for outputting communicating with the fluid flow passage 16 for outputting and the relay hole 26 for outputting corresponding thereto are respectively formed at positions different from each other, and the relay holes 24 and 26 and the branch holes 14a and 16a formed at the different positions are caused to communicate with each other via a recessed portion 29 formed on a bottom face of the sub-plate 13 so as to stretch over both the relay holes and the branch holes.

By causing corresponding relay hole and branch hole which are respectively in different positions to communicate with each other via such a recessed portion 29, even when the fluid flow passages 14, 15 and 16 and the relay holes 24, 25 and 26 on the mounting face 17 to be connected to each other have a positional relationship where they have been shifted from each other in a transverse direction, they can securely be connected to each other by the branch holes 14a, 15a and 16b bored vertically in the manifold main body 12, so that it is unnecessary to provide an inclined hole like the conventional product.

The manifold main body 12 and each sub-plate 13 are formed from metal material such as aluminum or aluminum alloy, and they are joined integrally by soldering joining faces 12a and 13a thereof. The soldering of these members can be performed by a frictional soldering process, an ultrasonic soldering process or the like.

In the former frictional soldering process, the manifold main body 12 and the sub-plate 13 are preliminarily heated at a temperature of 200 to 250° C. or so using a torch, and joining faces thereof are wetted with molten solder while oxide films on the joining faces are being mechanically removed by a wire brush, so that a preliminary soldering is performed. Thereafter, the joining faces of the manifold main body 12 and the sub-plate 13 are joined and reheated up to a melting point of solder, and the manifold main body and the sub-plate are integrated by rubbing the joining faces against each other and cooled.

Also, in the latter ultrasonic soldering process, the manifold main body 12 and the sub-plate 13 are preliminarily heated at a temperature of 200 to 250° C. or so, joining faces thereof are dipped in a solder bath and irradiated with ultrasonic waves for several seconds so that oxide films on the joining faces are removed and a preliminary soldering is performed. Thereafter, the manifold main body 12 and the sub-plate 13 are taken out of the solder bath and excess solder is removed, and the joining faces thereof are joined and reheated up to the melding point of solder and the manifold main body and the sub-plate are cooled after both the joining faces are rubbed against each other.

Figure 4:
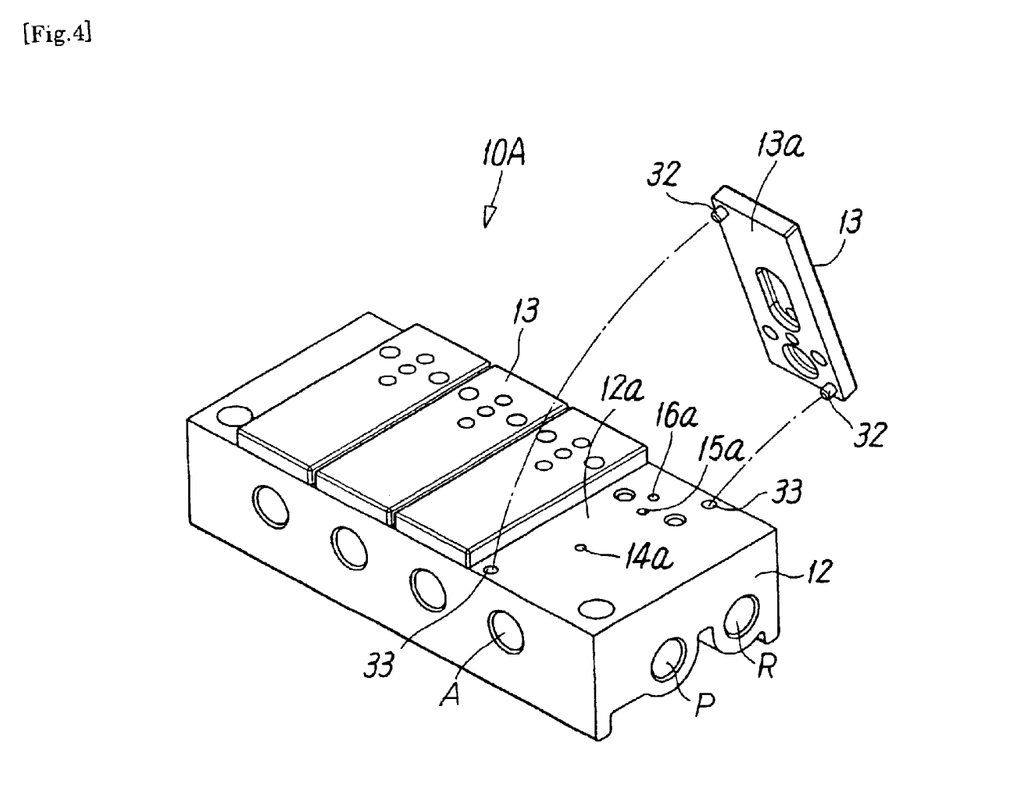
FIG. 4 is a perspective view of a structure different from that shown in FIG. 3, which shows a state where one of sub-plates is separated from a manifold.

According to such a process, the manifold main body 12 and the sub-plate 13 are integrated with each other by soldering the joining faces 12a and 13a all over the surfaces. Here, in the manifold main body 12 and the sub-plate 13, in order to prevent a positional deviation at a time of solder joining, it is preferable to provide positioning means comprising protrusions 32 and recesses 33 which engage each other mutually, as shown in FIG. 4. Regarding the protrusions 32 and the recesses 33, the protrusions 32 are provided on the side of the sub-plate 13 and the recesses 33 are provided on the side of the manifold main body 12 in the illustrated embodiment, but a structure reversed thereto may be employed. Also, it is preferable that the protrusion 32 can be detached so as not to obstruct grinding work in such a case that the joining faces 12a and 13a must be ground for soldering the manifold main body 12 and the sub-plate 13. For this reason, a protrusion 32 which is easily attachable/detachable due to elastic deformation, such as, for example, a spring pin formed by rounding a resilient metal plate in a cylindrical shape can be used preferably.

In FIG. 5, a state that electromagnetic valve 11 has been mounted on each mounting face 17 of the manifold 10A is shown. The electromagnetic valve 11 is a three-port type electromagnetic valve provided with a supplying port 21, a discharging port 23 and an output port 24, and therefore each mounting face 17 of the manifold 10A is formed in a mounting face of three-port type which is provided with a relay hole 24 for supplying, a relay hole 25 for discharging and a relay hole 26 for outputting. The electromagnetic valve 11 is screw-fixed to the screw holes 27 formed on each mounting face 17 by bolts.

The electromagnetic valve 11 has two first and second valve chambers 36a and 36b communicating with each other via a communication hole 37, a supplying valve seat 38 is formed between the first valve chamber 36a and the supplying port 21, the second valve chamber 36b communicates with the output port 23, and a discharging valve seat 39 is formed between the second valve chamber 36b and the discharging port 23. Also, a first valve body 41 which is driven by a movable iron core 40 to open/close the supplying valve seat 38 is disposed in the first valve chamber 36a, and a second valve body 42 which is moved in an interlocking manner with the first valve body 41 to open/close the discharging valve seat 39 is disposed in the second valve chamber 36b. The movable iron core 40 is driven by an electromagnetic actuation portion 45 provided with an exciting coil 43 and a fixed iron core 44.

When the exciting coil 43 is put in non-conductive state, the movable iron core 40 is positioned so as to be separated from the fixed iron core 44 by a resilient force of a return spring 46, as shown on a lower half in FIG. 5, so that the first valve body 41 closes the supplying valve seat 38 and the second valve body 42 opens the discharging valve seat 39. Accordingly, the supplying port 21 is closed, and the output port 24 and the discharging port 23 are in communication with each other.

When the exciting coil 43 is made in conductive state from the above state, the movable iron core 40 is attracted to a fixed iron core 44, as shown on an upper half in FIG. 5, so that the first valve body 41 opens the supplying valve seat 38 and the second valve body 42 closes the discharging valve seat 39. Accordingly, the supplying port 21 communicates with the output port 23 from the first valve chamber 36a via the communication hole 37 and the second valve chamber 36b, so that output fluid is taken out of the output port A of the manifold 10A.

In the illustrated embodiment, since the manifold 10A is mounted with the three-port type electromagnetic valve 11, the manifold 10A is provided with a structure corresponding thereto, but the manifold of this invention is not limited to such a structure. For example, the manifold of this invention may be a manifold that is mounted with a four-port type or five-port type electromagnetic valve. In a case of the manifold which is mounted with the five-port type electromagnetic valve, one fluid flow passage for supplying, two fluid flow passages for discharging, two fluid flow passages for outputting, and five branch holes communicating with these fluid flow passages on the manifold main body, and five relay holes communicating with the respective branch holes are provided on an electromagnetic valve mounting face on an upper face of each sub-plate.

Also, the sub-plate 13 has a size divided for an individual electromagnetic valve 11, but it may have such a size that it can be mounted with a plurality of electromagnetic valves.

Furthermore, the manifold 10A of the illustrated embodiment is constituted so as to mount a plurality of electromagnetic valves thereon, but it may be constituted so as to mount only one electromagnetic valve thereon. In this case, the manifold is different from a split type manifold of a stacking type shown in FIG. 6 regarding a point that the manifolds are respectively used alone without connecting them to each other.

Figure 6:
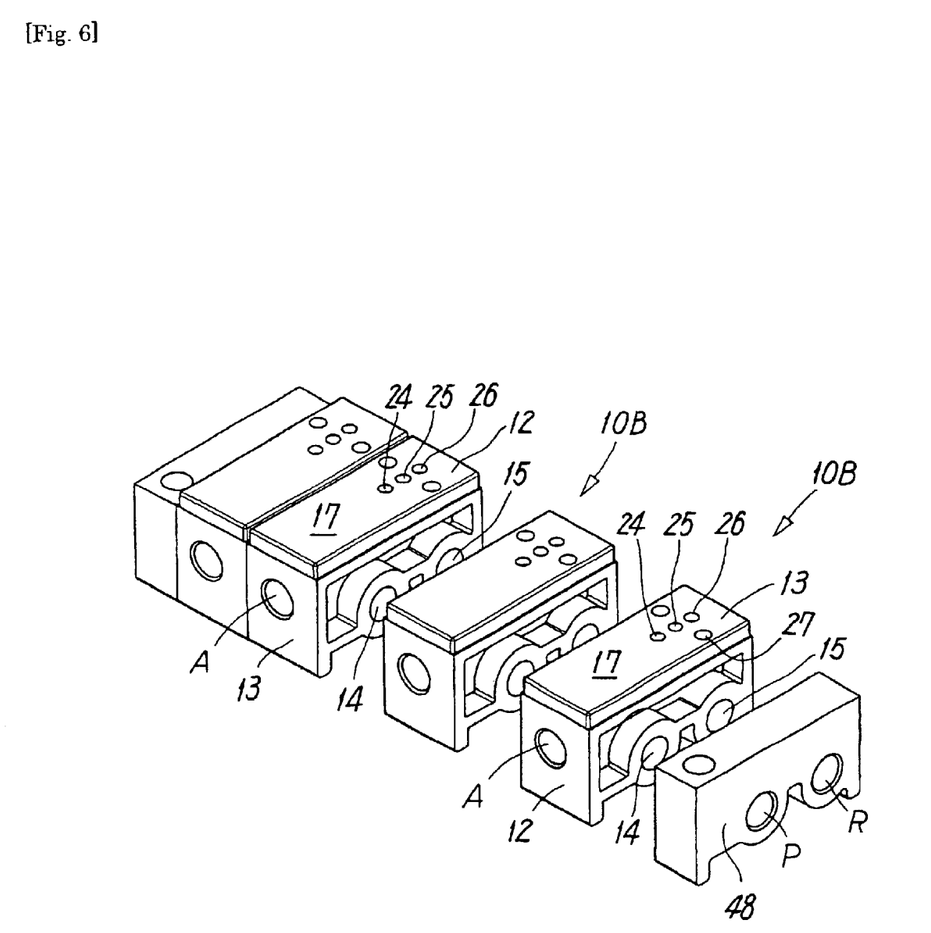
FIG. 6 is a perspective view showing a second embodiment of a manifold of the present invention.

In FIG. 6, as a second embodiment of a manifold, manifolds 10B of a split type that have been divided for respective electromagnetic valves are shown. The manifold 10B is formed such that a manifold main body 12 and a sub-plate 13 are mountable with only one electromagnetic valve 11, and it is used in an assembly together with other electromagnetic valve(s) by connecting the electromagnetic valves, which is different from the manifold 10A of the single type of the first embodiment. Then, in a case that a plurality of manifolds 10B are connected to each other in this manner, port blocks 48 provided with a plurality of ports P and R communicating with respective fluid flow passages 14 and 15 of the manifolds 10B are mounted to both ends of the connected body.

Regarding structures of the second embodiment other than the above structure, preferred modifications thereof and the like, since they are substantially the same as the manifold 10A of the first embodiment. Therefore, same reference numerals as those in the first embodiment are attached to same main constituent elements in the second embodiment and explanation thereof will be omitted.

Incidentally, in the respective embodiments, though the manifold main body 12 and the sub-plate 13 are integrated by soldering, the manifold main body 12 and the sub-plate 13 may be fixed to each other by screwing or the like in a state that a gasket is interposed therebetween.

As described in detail above, according to the present invention, even when the fluid flow passage inside the manifold and the relay hole on the electromagnetic valve mounting face are put in a positional relationship where they have been shifted in a transverse direction, they can securely be caused to communicate with each other by a branch hole bored from the mounting face vertically and straightly.

What is claimed is:

1. A manifold for an electromagnetic valve, comprising: one manifold main body provided inside with a plurality of fluid flow passages and at least one sub-plate which is mounted on the manifold main body and which is formed with a mounting face for an electromagnetic valve, wherein the manifold main body has a mounting face on which the sub-plate is to be mounted and a plurality of branch holes which extend from the mounting face vertically and straightly to communicate with the respective fluid flow passages, and the sub-plate has a plurality relay holes causing the respective branch holes to communicate with respective ports of the electromagnetic valve, the relay holes or at least one of the relay holes is formed at a position different from that of a corresponding branch hole, and the relay hole and the branch hole whose positions are different mutually communicate with each other via a recessed portion formed on a lower face of the sub-plate so as to stretch over the relay hole and the branch hole, and wherein the manifold main body and the sub-plate are respectively formed from metal material and are joined integrally by soldering joining faces thereof.

2. A manifold according to claim 1, wherein the manifold main body and the sub-plate have positioning means comprising a protrusion and a recess which engage each other in order to prevent positional deviation at a time of solder joining.

3. A manifold according to claim 1, wherein the manifold main body is mountable with a plurality of electromagnetic valves and has a plurality of the sub-plates corresponding to the individual electromagnetic valves.

4. A manifold according to claim 1, wherein the manifold main body is of a split type where one electromagnetic valve is mountable, and has one sub-plate and is constituted so as to be made usable by connecting a plurality of manifold main bodies.

5. A manifold for an electromagnetic valve, comprising: one manifold main body provided inside with a plurality of fluid flow passages and at least one rectangular sub-plate which is mounted on the manifold main body and which is formed with a mounting face for an electromagnetic valve, wherein the manifold main body and the sub-plate are respectively formed from metal material and are joined integrally by soldering joining faces thereof; and the manifold main body has a mounting face on which the sub-plate is to be mounted and a plurality of branch holes which extends from the mounting face vertically and straightly to communicate with the respective fluid flow passages, and the sub-plate has a plurality relay holes causing the respective branch holes to communicate with respective ports of the electromagnetic valve, the relay holes or at least one of the relay holes is formed at a position different from that of a corresponding branch hole, and the relay hole and the branch hole whose positions are different mutually communicate with each other via a recessed portion formed on a lower face of the sub-plate so as to stretch over the relay hole and the branch hole.

6. A manifold according to claim 5, wherein the manifold main body is mountable with a plurality of electromagnetic valves and has a plurality of the sub-plates corresponding to the individual electromagnetic valves.

7. A manifold according to claim 5, wherein the manifold main body is of a split type where one electromagnetic valve is mountable, and has one sub-plate and is constituted so as to be made usable by connecting a plurality of manifold main bodies.

* * * * *